(12) United States Patent
Culpi et al.

US007321175B2

(10) Patent No.: US 7,321,175 B2
(45) Date of Patent: Jan. 22, 2008

(54) LOW COST PRECISION LINEAR ACTUATOR AND CONTROL SYSTEM

(75) Inventors: William Culpi, Lake Forest, CA (US); Thomas K. Rigney, Silverado, CA (US); Karl R. Honigmann, Irvine, CA (US); Aziz A. Mahmoud, Fountain Valley, CA (US)

(73) Assignee: Newport Corporation, Irvine, CA (US)

( * ) Notice: Subject to any disclaimer, the term of this patent is extended or adjusted under 35 U.S.C. 154(b) by 201 days.

(21) Appl. No.: 11/043,001

(22) Filed: Jan. 24, 2005

(65) Prior Publication Data

US 2005/0184599 A1 Aug. 25, 2005

Related U.S. Application Data

(60) Provisional application No. 60/539,402, filed on Jan. 26, 2004.

(51) Int. Cl.
*H02K 41/00* (2006.01)
(52) U.S. Cl. .............................. 310/12; 310/15; 310/80
(58) Field of Classification Search .................. 310/80, 310/12–15, 49 R; 318/135
See application file for complete search history.

(56) References Cited

U.S. PATENT DOCUMENTS

| 3,479,897 A | * | 11/1969 | Holthofer | 74/441 |
|---|---|---|---|---|
| 4,484,287 A | * | 11/1984 | Gamo et al. | 700/177 |
| 5,467,661 A | * | 11/1995 | Lange | 74/441 |
| 5,839,321 A | * | 11/1998 | Siemons | 74/441 |
| 6,142,032 A | * | 11/2000 | Creager | 74/441 |
| 6,285,151 B1 | * | 9/2001 | Wright et al. | 318/560 |
| 6,603,229 B1 | * | 8/2003 | Toye, IV | 310/90 |
| 6,657,847 B1 | * | 12/2003 | Wright et al. | 361/160 |
| 2007/0013326 A1 | * | 1/2007 | Kling et al. | 318/66 |

FOREIGN PATENT DOCUMENTS

DE 4001182 A1 * 7/1990

OTHER PUBLICATIONS

International Search Report/Written Opinion from the International Searching Authority/US, issued on Feb. 26, 2007, PCTUS2005/002278.
International Preliminary Report on Patentability from the International Bureau, issued on May 1, 2007, PCTUS2005/002278.

* cited by examiner

*Primary Examiner*—Thanh Lam
(74) *Attorney, Agent, or Firm*—Grant Anderson LLP (57) ABSTRACT

Embodiments of the present invention relate to a linear actuator in which the play and backlash in the linear motion of a stepper motor is reduced through the use of a torsion spring coupled to the stepper motor splined shaft. Also, embodiments of the invention include a controller designed for holding in the hand or mounting to a table with a bi-directional self-zeroing control knob which controls actuator speed and displacement. A flash memory unit may be included in some embodiments in order to save position information and other information about the linear actuator when power to the linear actuator is stopped.

34 Claims, 12 Drawing Sheets

LOW COST PRECISION LINEAR ACTUATOR AND CONTROL SYSTEM

CROSS REFERENCE TO RELATED APPLICATIONS

This application claims priority from pending U.S. Provisional Patent Application Ser. No. 60/539,402, filed Jan. 26, 2004, by Thomas K. Rigney, William Culpi and Karl Honigmann, titled "Low Cost Precision Linear Actuator and Control System", the entirety of which is incorporated by reference herein.

BACKGROUND

Currently available high precision linear actuators for controlling motion are expensive to produce and procure primarily due to the cost of the precision components from which such devices are manufactured. Stepper motors are often used as components of linear actuators because their low cost, their discrete and controllable translation steps and their ability to hold a position against small force. However, linear actuators using stepper motors have typically been limited in performance with regard precise repeatability due to excessive play and backlash in the components of the stepper motor and actuator assembly. Specifically, when a typical linear actuator utilizing a stepper motor is stopped then started, or reversed in direction, there is some play between external splined shaft and the internal splined boss, causing some hysteresis of motion as the spline shaft takes up the clearance. This play or backlash usually and resulting hysteresis of motion results in a lack or repeatability of position and lack of overall precision. What has been needed is a low cost linear actuator having a high degree of precision with regard to repeatability of position and movement. What has also been needed is a controller for a linear actuator that is versatile, simple and intuitive to use.

SUMMARY

In one embodiment, a position control system includes a linear actuator having a motor with a shaft that has a splined portion and a threaded portion. The motor also has a threaded rotor that includes a threaded portion engaged with the threaded portion of the shaft, a splined boss having a splined portion engaged with a splined portion of the shaft and a torsion spring coupled between the shaft and the boss. The torsion spring is configured to apply a rotational torque to the shaft relative to the splined boss. A controller is coupled to the linear actuator by an information conduit.

In another embodiment, a position control system includes a linear actuator including a motor with shaft having a splined portion and a threaded portion. The motor also includes a threaded rotor having a threaded portion engaged with the threaded portion of the shaft, a splined boss having a splined portion engaged with a splined portion of the shaft and a torsion spring coupled between the shaft and the boss. The torsion spring is configured to apply a rotational torque to the shaft relative to the splined boss. A controller is coupled to the linear actuator by a first information conduit. A computer is coupled to the controller by a second information conduit which is configured to allow a user to send information to the controller from the computer and control the linear actuator remotely from the computer.

In another embodiment, a linear actuator includes a motor with shaft having a splined portion and a threaded portion, a threaded rotor having a threaded portion engaged with the threaded portion of the shaft, a splined boss having a splined portion engaged with a splined portion of the shaft. A torsion spring is coupled between the shaft and the boss and configured to apply a rotational torque to the shaft relative to the splined boss.

In yet another embodiment, a linear actuator controller includes a controller body, a central processing unit (CPU) disposed on the controller body, a bi-directional control knob coupled to the CPU and at least one external information port coupled to the CPU. Another embodiment of a linear actuator controller includes an ergonomic controller body, a CPU disposed on the controller body, a self-zeroing bi-directional control knob coupled to the CPU and at least one external information port coupled to the CPU wherein the CPU is configured to control the speed of a linear actuator in proportion to the amount of angular displacement of the control knob.

In one embodiment of a method of positioning a linear precision actuator, a position control system is provided. The position control system includes a linear actuator having a stepper motor and a controller coupled to the linear actuator by an information conduit. The controller includes a controller body, a CPU disposed on the controller body, a bi-directional control knob coupled to the CPU and at least one external information port coupled to the CPU. Once power is supplied to the controller, the control knob is displaced and information correlating to displacement magnitude and direction of the control knob is transmitted to the CPU. The CPU transmits a stream of pulses or other information to the stepper motor of the linear actuator that produces a linear actuator displacement velocity that correlates in direction to the direction of the control knob and correlates in magnitude to the magnitude of displacement of the control knob.

In another embodiment, a position control system includes a linear actuator including a motor with a shaft, a controller coupled to the linear actuator by an information conduit and an automatic setting save circuit coupled to a CPU which provides power to the CPU after the supply voltage drops below a preselected operating threshold of the linear actuator so as to allow the CPU to save position information about the linear actuator.

These features of embodiments will become more apparent from the following detailed description when taken in conjunction with the accompanying exemplary drawings.

DETAILED DESCRIPTION

Embodiments of the present invention relate to a linear actuator with small size and at low cost for use moving optical elements, on optical mounts in a very precise manner using an ergonomic control system. Embodiments include a linear actuator in which the play and backlash in the linear motion of a splined shaft of a stepper motor of the linear actuator is reduced through the use of a torsion spring coaxial with the stepper motor splined shaft. This enables the linear actuator to perform with high uni-directional repeatability, bi-directional repeatability, and high position repeatability for an actuator that uses a stepper motor. A position control system that incorporates such a linear actuator having a very compact form factor or outer profile can be used to drive precision optical mounts, precision motion stages, and other devices ordinarily actuated by micrometers. Also, a controller may be used for controlling the linear actuator which is designed for holding in the hand of a user with a self-zeroing bi-directional control knob which controls the linear actuator speed and displacement. Some controller embodiments include an ergonomically designed controller body.

Figure 1:
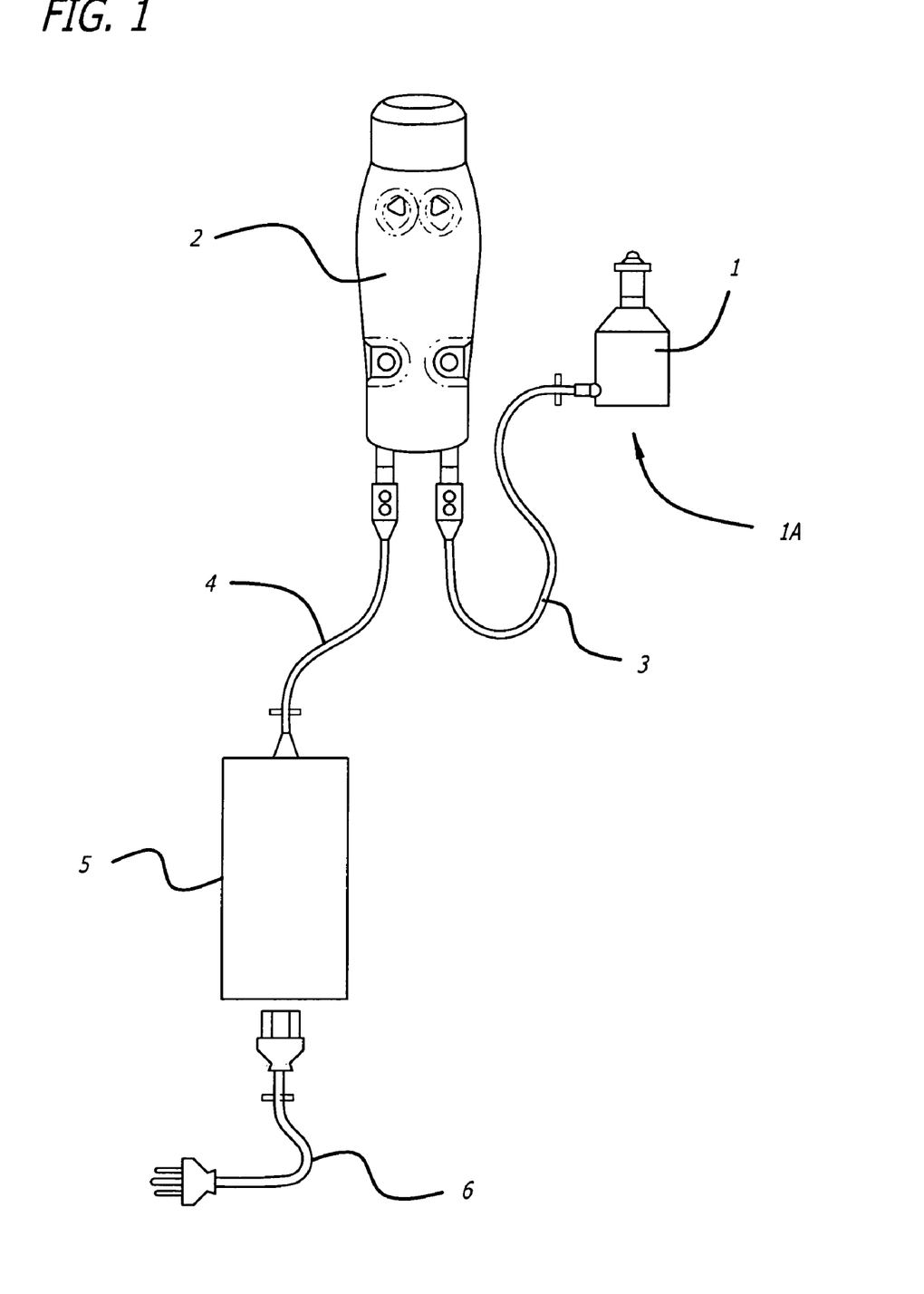
FIG. 1 illustrates a schematic view of a position control system embodiment.

FIG. 1 shows an embodiment of a position control system 1A that includes a linear actuator 1, connected to a controller 2 by an information conduit in the form of cable 3 that is coupled to external information ports of the linear actuator 1 and controller 2 respectively. The controller 2 is powered by power supply 5 which is connected to the controller by power cable 4. The power supply itself is connected to system power by EEC power cable 6. Linear actuator 1, shown in more detail in FIGS. 2-5, utilizes a stepper motor 7 with spline shaft 9, having a splined portion 9A and a threaded portion 9B, that moves axially within the stepper motor housing 7A which has a boss, specifically a splined boss 88 with a splined portion 7B that is configured to mate with the splined portion 9A of the shaft 9. Stepper motor 7 is received into a linear actuator housing 17 and rests on stop 19. Stop 19 is formed into the proximal end plate of the actuator housing 17. The proximal end plate may be integral with the cylindrical portion of the actuator housing 17 or may be formed from a piece separate from the cylindrical portion. For some embodiments, the linear actuator housing 17 is configured as a metal cylinder as shown and can be made from high strength materials such as aluminum. Nose piece 8 is threaded and screws into housing 17 and bears on face of stepper motor 7 thus holding stepper motor 7 against stop 19. Nose piece 8 also has a threaded boss 8A that is configured to be coupled to standard micrometer mount receptacles on standard optical components. In one embodiment, the threaded boss may have a thread configuration of ⅜ inch by 24 threads per inch.

Figure 2:
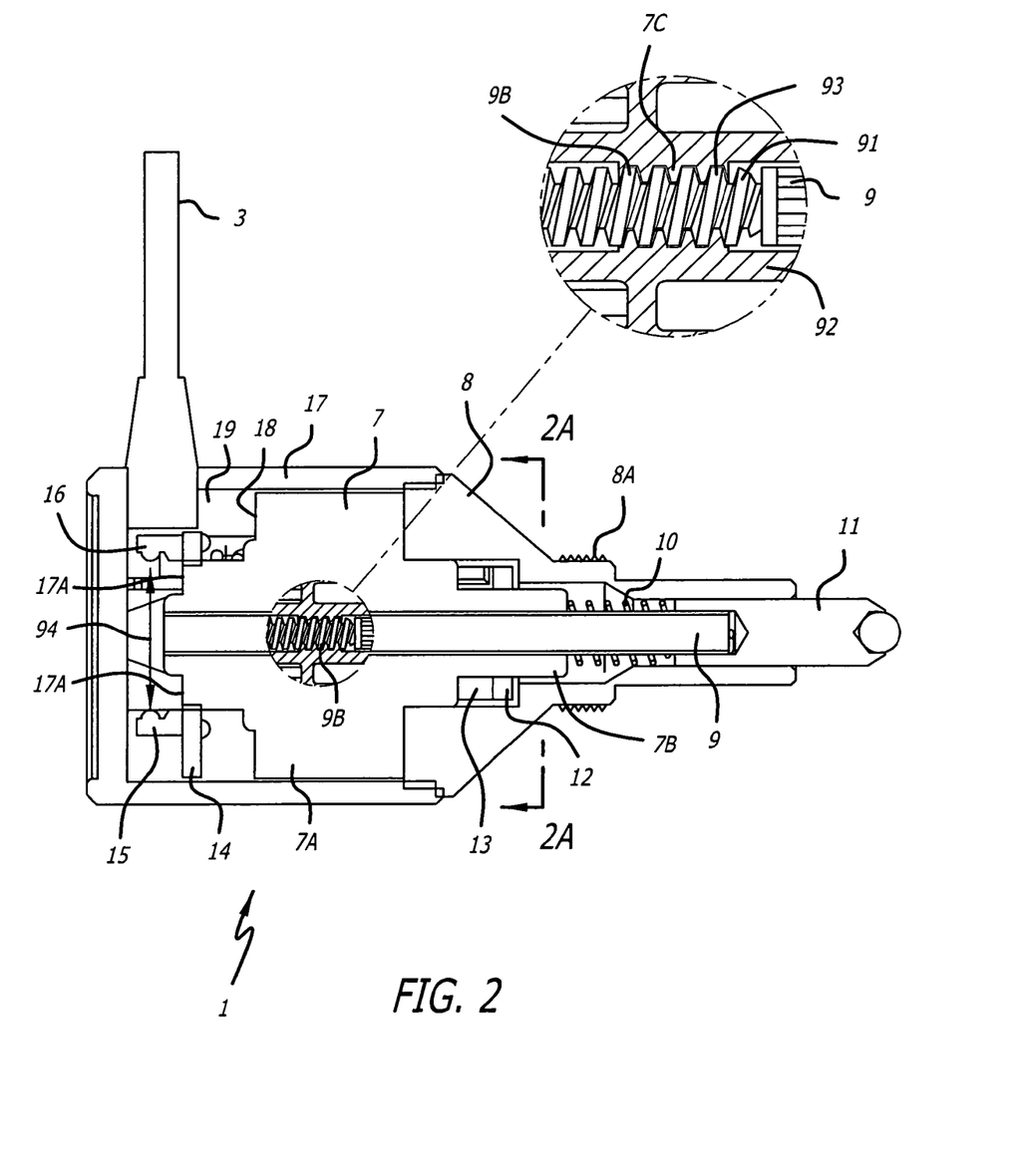
FIG. 2 is an elevational view in partial section of a linear actuator embodiment.
Figure 3:
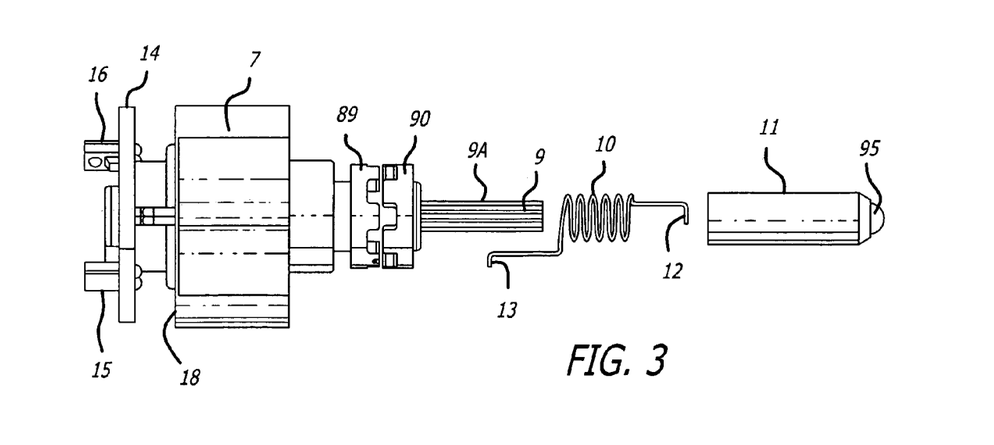
FIG. 3 shows an elevational exploded view of the stepper motor and torsion spring assembly of the linear actuator of FIG. 1.
Figure 4:
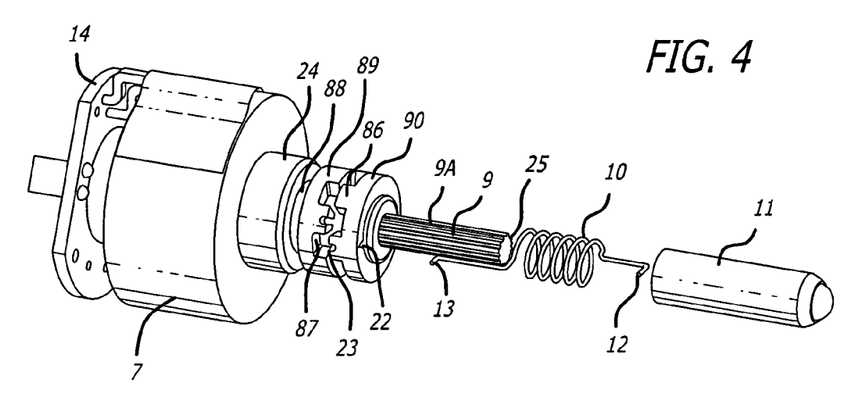
FIG. 4 shows an exploded view in perspective of the stepper motor and torsion spring assembly of the linear actuator of FIG. 1.

Torsion spring 10 having a first end and a second end is disposed coaxially over motor shaft 9. First end of torsion spring has tang 13 that extends through slot 22 and engages with slot 23 on a first castle washer 90. First castle washer 90 has teeth 86 that engage with teeth grooves 87 on identical or mating second castle washer 89 which has been received onto boss 88 of stepper motor 7. The inside diameter of second castle washer 89 is fixed to boss 88 of the stepper motor housing 7A by means of an interference fit or adhesive bonding. Second castle washer 89 prevents first castle washer 90 from rotation about its axis by engagement of the teeth 86 with teeth grooves 87, but forms an adjustment mechanism which allows adjustment of the torsion spring 10 torque applied to the shaft 9 by temporarily disengaging the teeth 86 from the grooves 87 and twisting the first castle washer 90.

During assembly, first castle washer 90 is rotated against torsion spring 10 and then teeth 86 of first castle washer 90 are engaged with grooves 87 of stationary second castle washer 88. Tang 12 on second end of torsion spring 10 is fixed in place by engaging with the splines 25 of the splined portion 9A of the motor shaft 9. The tang 12 is secured or captured in position in the splines of the motor shaft 9 by actuator tip 11 which is disposed over the torsion spring. Suitable stepper motors 7 for some embodiments of the control system may include the Linear Actuator Series 26000 manufactured by Haydon Switch and Instrument Company, Waterbury, Conn. Embodiments of the stepper motor may be two phase permanent magnet type stepper motors with open loop control obviating the need for expensive feedback loops and encoders. However, closed loop embodiments with feedback loops or circuits could also be used for some embodiments. Some useful stepper motor embodiments are configured to have about 48 steps per revolution or about 7.5 degrees between steps. Axial repeatability for linear actuator embodiments having this configuration may have axial position repeatability of about 5 micrometers to about 15 micrometers for bi-directional translation and about 0.5 micrometers to about 4 micrometers for unidirectional movement.

Figure 2A:
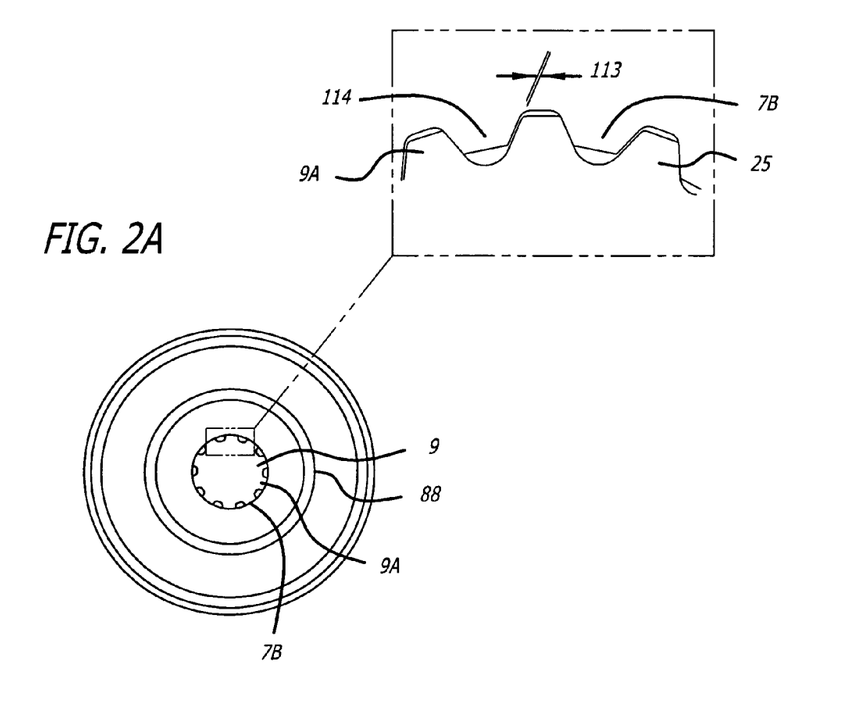
FIG. 2A is a transverse cross sectional view and close-up detail of the linear actuator of FIG. 2 taken along lines 2A-2A of FIG. 2 and illustrating the play between motor shaft splines and motor boss spline.

Torsion spring 10 imparts a torsional load to stepper motor splined shaft 9, which rotates spline teeth 25 of the splined portion 9A of the shaft 9 against the mating splined portion 7B on the stepper motor boss 88. This eliminates lost motion or backlash when the motor starts or changes direction, thus increasing the reliability of the stepper motor counts as a measure of distance moved by the actuator tip 95. Gear teeth 93 of an external worm gear 91 formed on the threaded portion 9B of the splined motor shaft 9 engage a mating threaded portion 7C of a rotor or threaded rotor 92 of the stepper motor 7, as shown in FIG. 2. As the rotor 92 of the stepper motor 7 rotates in the clockwise direction, stepper motor rotor 92 drives worm gear 91 and motor shaft 9. This drives a first end of stepper motor shaft 9 away from the body 7A of the stepper motor 7. Referring to FIG. 2A, when the stepper motor rotation is stopped, the splined portion 9A of the motor shaft 9 remains biased against the internal splines 114 of the splined portion 7B of motor boss 88, so there is no backlash or lost motion and lost accuracy of the known distance moved by actuator tip 95. When stepper motor 7 is reversed, worm gear 91 is still biased against the threaded portion 7C motor rotor 92, and stepper motor shaft 9 is allowed to drive back, driving the first end of motor shaft 9 towards the body of stepper motor 7. Axial backlash of the motor shaft is not of concern for this embodiment as the actuator tip 95 will be constantly exerting axial force on an external component to be moved and the configuration shown is designed only to exert outward axial force and not to produce an inward or proximal axial for against a component that is pulling on the actuator tip 95. Elimination of the rotational play between the splined shaft 9 and the mating slotted or splined portion 7B of boss 88 of the stepper motor housing 7A reduces the mismatch of the relationship between step counts of the stepper motor 7 and actuator tip 95 position.

Figure 5:
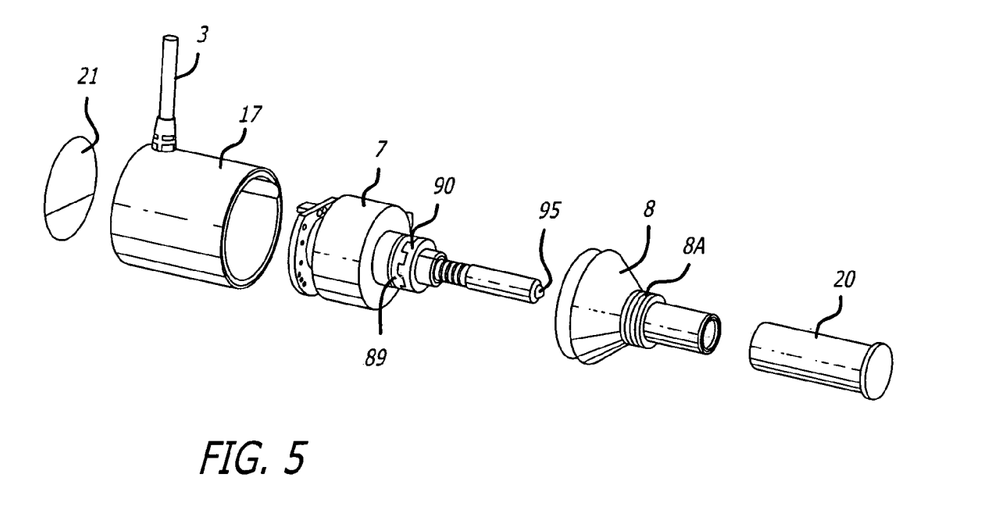
FIG. 5 shows an exploded view in perspective of the stepper motor and torsion spring assembly and the linear actuator housing of the linear actuator of FIG. 1.

Generally, linear actuators using stepper motors have the actuator housing mounted to the front of the stepper motor housing 7A, which may allow compliance or deformation of the stepper motor housing 7A to be transferred to the motor shaft 9. In embodiments of the invention discussed herein, the linear actuator housing 17 is coupled or secured to the back of the stepper motor housing 7A at contact surface 17A, making the motor shaft 9 more solidly coupled to the linear actuator housing 17 through the stepper motor housing 7A. Overall, the position control system embodiment 1A produces a high resolution actuation per unit dollar of cost and size. The compact size of some linear actuator embodiments may achieved by configuring a stepper motor with a longer than normal shaft out of the back side of the motor. The compact size allows the linear actuator 1 to be used in the tight confines of an optical breadboard where optical mounts are close together. The small size of the linear actuator 1 also allows the use of multiple actuators mounted on a single optical mount to drive tip, tile, and translation of an optical mount. The linear actuator 1 embodiments discussed herein may also be used in a vacuum environment and be remotely controlled by a controller 2 or computer 102A, discussed below, to allow maintenance of the vacuum and adjustment of the set up within the vacuum.

During actuation, the position control system 1A is used by first supplying power to the controller 2 and linear actuator 1 from the power supply 5. Once the desired mode of the controller 2 has been selected, the control knob 42 may be used to advance and retract the actuator tip 95 of the linear actuator 1. The controller 2 actuates the linear actuator 1 in some embodiments by sending a pulse or stream of pulses of electrical information of power to the stepper motor 7 of the linear actuator 1. It may be useful for some embodiments of the linear actuator 1 to have a definite termination or stop point as the shaft 9 is withdrawn into the stepper motor housing 7A. In one embodiment, as a first end of motor shaft 9 is moving towards the housing 7A of stepper motor 7, a second end of motor shaft 9 is moving away from the housing 7A of stepper motor 7. As the second or proximal end of the motor shaft 9 moves away from motor 7 toward the rear of the linear actuator housing 17, it enters and interrupts a beam of light 94, shown in FIG. 2, emitted by light emitting diode 15 that is detected by photodiode 16. The light emitting diode 15 and photodiode 16 are coupled to the CPU of the controller 2. These components 15 and 16 may be mounted on a PCB, pressed and glued on the end of the stepper motor housing or housing of the linear actuator. When the second end of the motor shaft 9 interrupts light beam 94, an electrical signal is generated and sent to a CPU or other electronics of the controller 2 which then provides a signal to the stepper motor 7 to stop rotation and thereby stop proximal movement of the shaft 9.

The front end stop of the motor shaft 9 may be determined with limits programmed into software that is run by the CPU of the controller 2 or computer 102A. Because the motor 9 is a stepper motor 9, it allows the controller 2 to compute the position of the shaft 9 by counting the number of steps of the stepper motor 7 from a zero or other known starting position. This open loop system can be used without the use of expensive encoder devices, such as optical encoders. By counting motor steps, the controller 2 computes how far the stepper motor shaft 9 has moved in the axial direction. Without the torsion spring 10 assembly and configuration discussed above, there may be play between the spline 25 of the motor shaft 9 and the splined portion 7B of the motor housing 7A, with a resulting finite loss of rotation motion as the shaft rotation takes up the play between the external spline and the internal spline. This lost motion may result in errors in the controller's computation of the location of the actuator tip 95 of the linear actuator 1 when the motor 7 is stopped and then started again. The maximum axial displacement of the shaft for some embodiments of the linear actuator may be from about 5 mm to about 25 mm, specifically, from about 10 mm to about 15 mm. The outside dimensions of an embodiment of a linear actuator may be about 30 mm in diameter and about 60 mm in length. Embodiments of the linear actuator may be operable while resisting forces of up to about 15 Newtons to about 25 Newtons.

Referring to FIGS. 6-16A, the position control system 1A includes a handheld controller 2 that has an integrated controller, driver and control knob 42. The handheld controller 2 is designed to fit easily and ergonomically in one hand of a user and allow manipulation of the control knob 42 with the user's thumb and index finger. The controller 2 also has features which allow for easy mounting to the hole pattern of a vibration isolation table while providing easy to the adjustment knob 42. The controller housing or body 30A is generally ovoid in transverse cross section having a narrow thickness and width, allowing for multiple controllers 2 to be mounted side by side in adjacent pairs of table mounting holes. Embodiments of the controller housing or body 30A may have a length of about 4 inches to about 7 inches, and a transverse width of about 1.5 inches to about 3.0 inches. The adjustment or control knob 42 may be a self-zeroing bidirectional knob that returns by spring action to a zero position. The zero position of the control knob 42 corresponds to no movement of the linear actuator shaft 9. As the control knob 42 is displaced from the zero position, the controller generates a signal to the motor 7 to advance or retract at a rate proportional to the magnitude of the control knob 42 displacement for some embodiments.

When the control knob is released from a displaced position, specifically a displaced angular position, the self-zeroing feature of the control knob 42 returns the control knob 42 to the zero position and the controller then ceases movement of the shaft 9 of the linear actuator 1. As discussed above, the speed of axial movement of the shaft 9 of the linear actuator may be a function of the amount or magnitude of angular displacement of the control knob 42 from the zero position of the control knob 42. Although the control knob embodiment 42 illustrated herein is configured for rotational movement, a similar control knob having similar features could be used with linear or other typed of actuating motion.

The mechanism of the control knob 42 embodiment allows for easy one handed control and provides multiple functions and features. The operator can turn the linear actuator 1 on or off by pressing down on the control knob 42 in an axial direction. Once the controller power is turned on by pushing control knob 42 towards the controller body 30A, this same action can be used to toggle between a LOCAL and REMOTE state, discussed below. Clockwise rotation of control knob 42 results in extension of the actuator tip 95. When the operator releases knob 42, the know returns to home and the velocity of the actuator tip 95 goes to zero and stays in its position. If the operator rotates knob 42 counterclockwise, the actuator tip 95 retracts towards the linear actuator housing 17. The further the operator turns the control knob 42 either clockwise or counterclockwise, the faster the actuator tip 95 will extend or retract, respectively.

Figure 6:
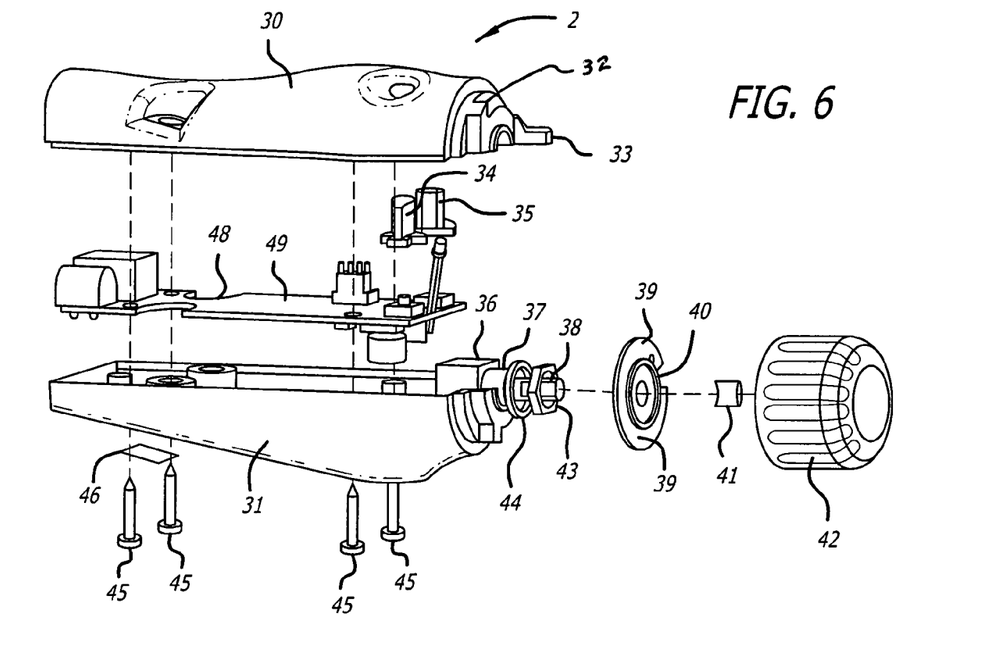
FIG. 6 is an exploded view in perspective of a controller embodiment.
Figure 7:
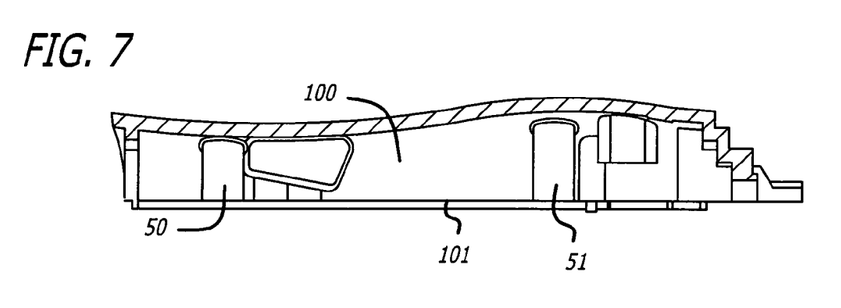
FIG. 7 is an elevational view in longitudinal section of a controller body upper half of the controller embodiment of FIG. 6 taken along lines 7-7 of FIG. 9 below.
Figure 8:
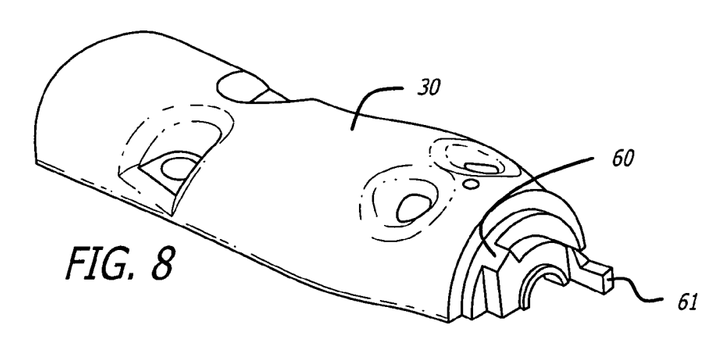
FIG. 8 is a perspective view of the body upper half of the controller of FIG. 6.
Figure 9:
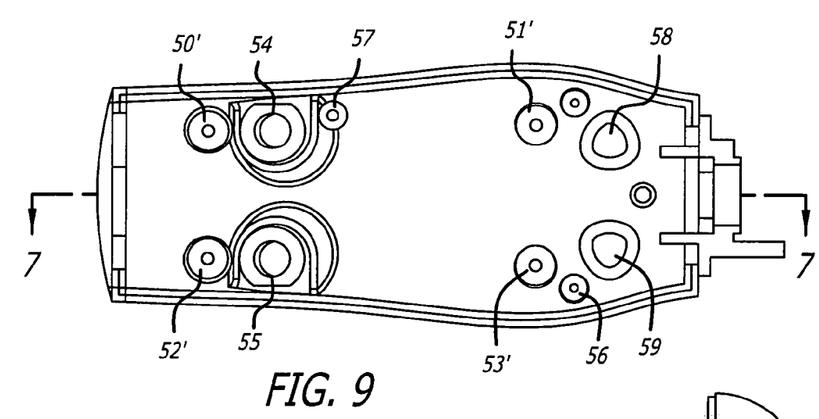
FIG. 9 is an elevational view of the body upper half of the controller of FIG. 6.
Figure 10:
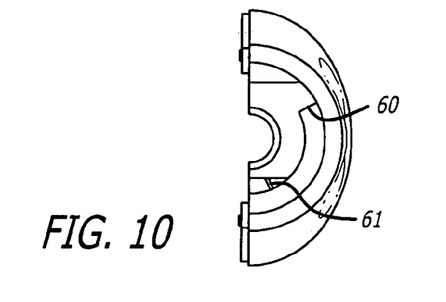
FIG. 10 is a proximal end view of the body upper half of the controller illustrating control surface elements for the control knob of the controller of FIG. 6.
Figure 11:
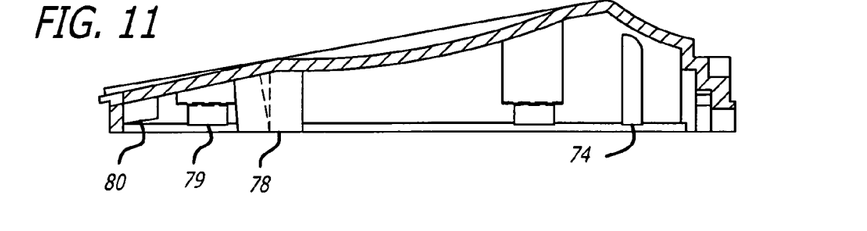
FIG. 11 is an elevational view in longitudinal section of a controller body lower half of the controller embodiment of FIG. 6 taken along lines 11-11 of FIG. 14 below.
Figures 12, 13:
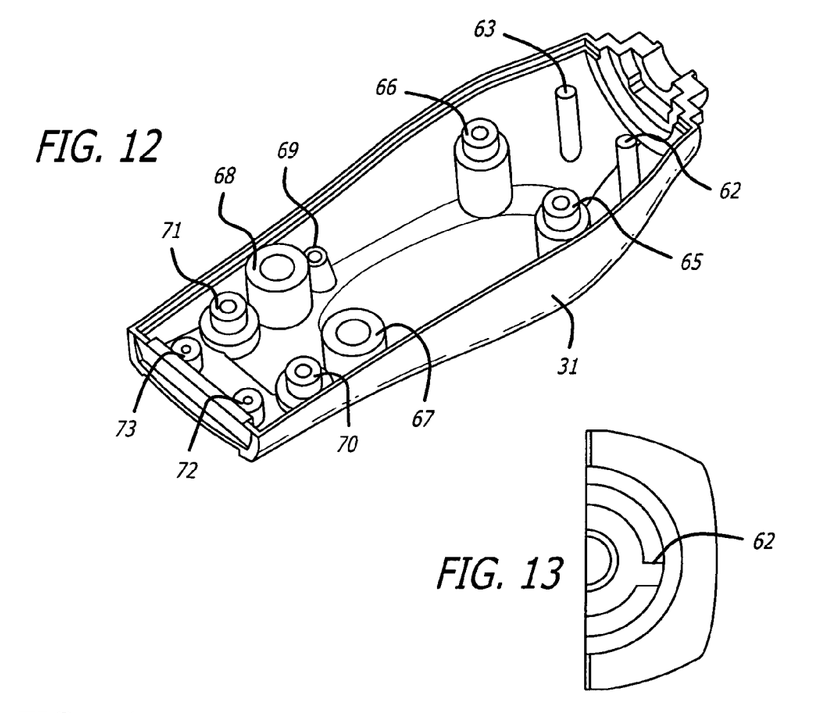
FIG. 12 is a perspective view of the body lower half of the controller of FIG. 6.
FIG. 13 is a proximal end view of the body lower half of the controller illustrating control surface elements for the control knob of the controller of FIG. 6.
Figure 14:
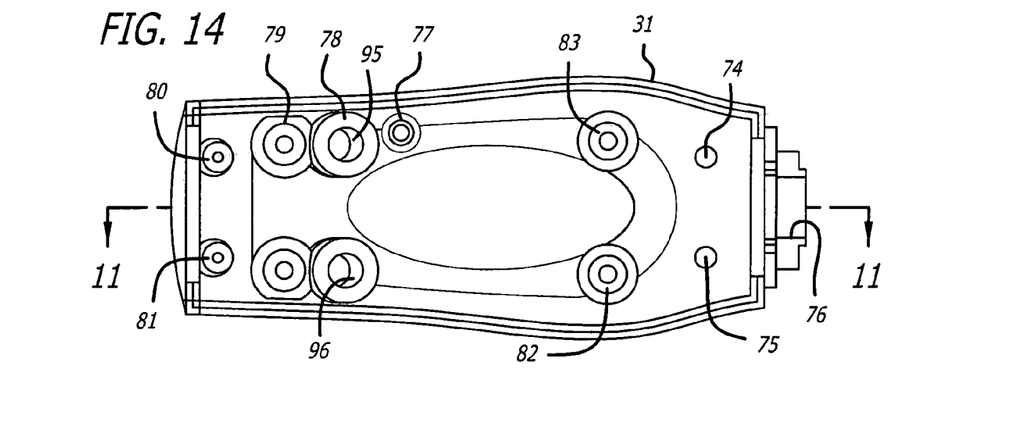
FIG. 14 is an elevational view of the body lower half of the controller of FIG. 6.
Figure 15:
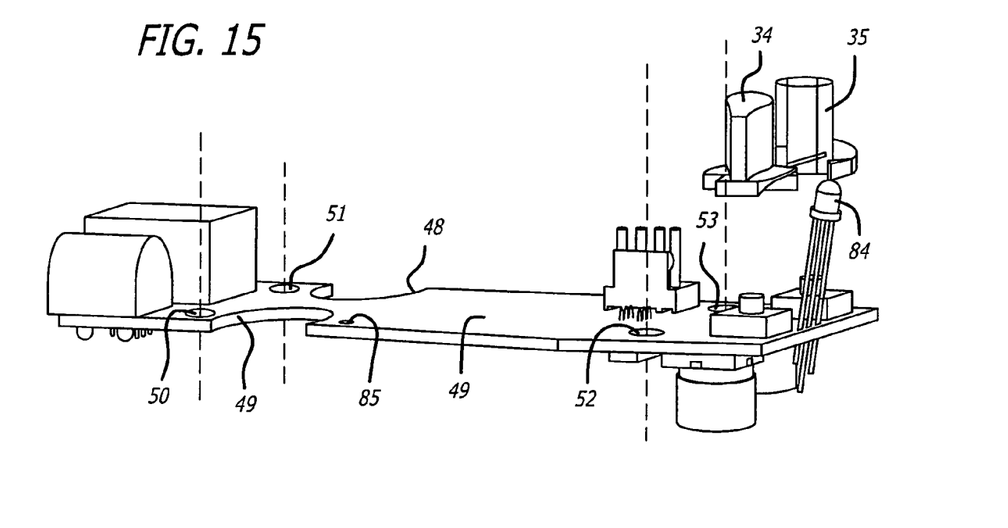
FIG. 15 shows a perspective view of a circuit board assembly of the controller of FIG. 6.

The controller 2 includes an upper body half 30 and lower body half 31, held together with fasteners 45. Located and held between the body halves is control circuit board 49 with holes 50, 51, 52, and 53, through which fasteners 45 extend and thread into posts 50', 51', 52', and 53' in upper body half 30. Holes 54 and 55 also extend through the upper half 30 and holes 95 and 96 extend through bosses 78 in lower body half 31 such that commercial fasteners (not shown) extend through holes 54, 55, 95 and 96 and fasten to a mounting platform such as a vibration isolation table used in laser experiments and the like. For some embodiments, the lateral spacing of the substantially parallel holes 95 and 96 may be about 1 inch. The transverse distance between the axes of these fasteners is equivalent to the standard spacing of the receiving holes (not shown) in such experiment tables. The width of controller body halves 30 and 31 are narrow enough that a plurality of controllers may be fastened down to an experiment table to adjacent pairs of threaded holes. This saves valuable space on experiment tables, such as vibration isolation tables.

Referring to FIG. 6, boss 37 of optical encoder potentiometer 36 rests in radius 76 of body lower half 31. Upper body half 30 is then placed over lower body half 31 and the body halves are held together by snap ring 44. Optical encoder 36 is held in place by lock nut 43 threaded onto the shaft of optical encoder 36. The optical encoder is used as a very fine resolution potentiometer to drive the stepper motor 7. Angular displacement of the control knob 42 in either the clockwise or counterclockwise displacement will cause the encoder 36 to send a signal to the CPU of the controller 2 which then sends a signal to the coupled linear actuator 1 such that the shaft 9 moves along its longitudinal axis, thus moving the ball 95 at actuator tip 11. Actuator tip 11 and ball 95 are covered with dust cap 20 when the actuator is not in use.

Figure 16:
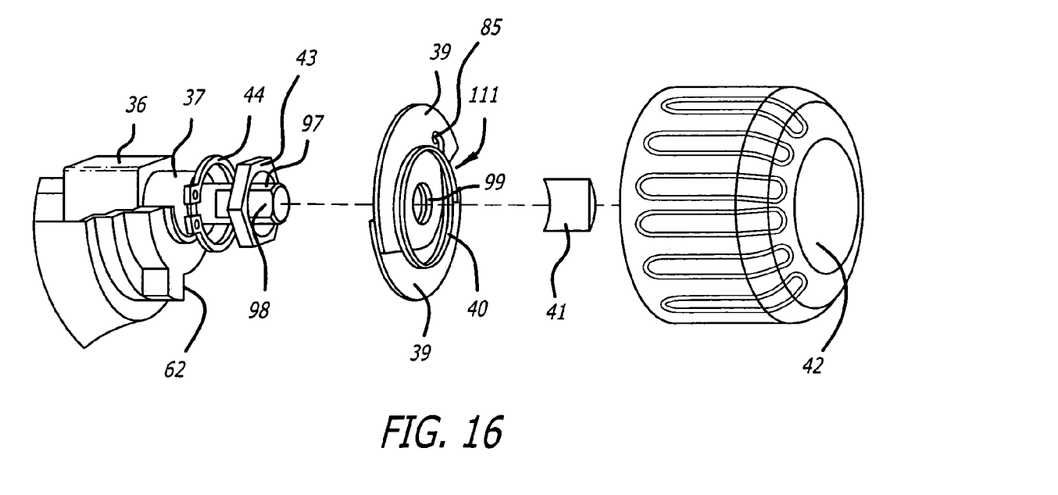
FIG. 16 is an exploded view in perspective of a control knob assembly of the controller of FIG. 6.54
Figure 16A:
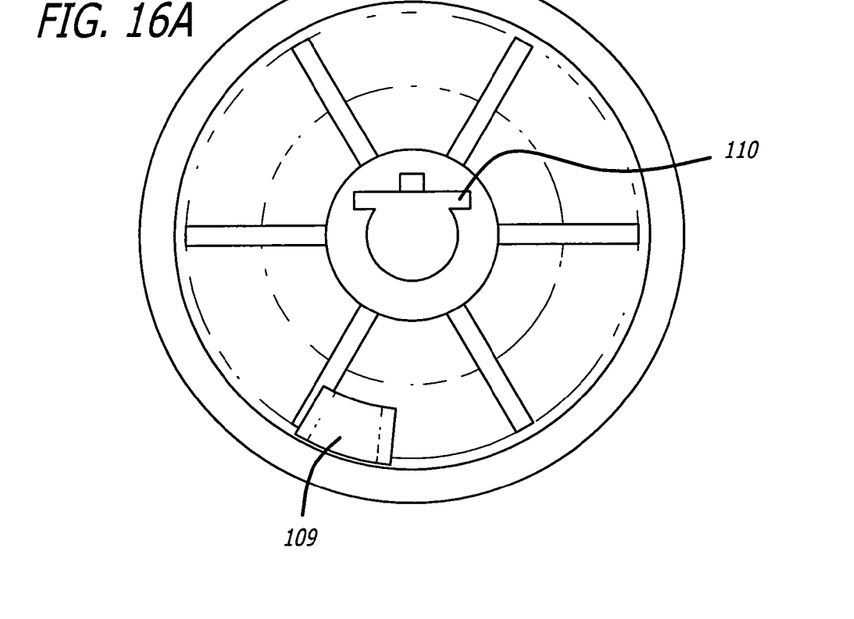
FIG. 16A Inside view of controller knob.

Referring to FIGS. 16 and 16A, an embodiment of a specific mechanism for controlling the speed, location and direction of movement of the linear actuator 1 is shown. As knob 42 is turned to increasing angular displacement, the speed of motion of actuator tip 11 and ball 95 increases as a signal from the linear encoder command the stepper motor to increase speed. Maximum travel of knob 42 is limited in the counterclockwise direction by the engagement of stop 60 on upper cover 30 with stop 109 (see FIG. 16A) in knob 42. Maximum travel of knob 42 is limited in the clockwise direction is by the engagement of stop 62 on lower cover 31 with knob stop 109. As knob 42 is returned towards a home position, speed of the actuator decreases until the control knob 42 reaches the zero or home position. The home or zero position is defined mechanically by stop 61 on controller upper cover 30 coming to bear interfacing with gap 111 in between plates 39 as shown in FIG. 16. Plates 39 are located onto shaft 97 of linear encoder 36 through holes 99.

Control knob 42 is held in place on linear encoder shaft 97 by flat spring 41, which is received into spring retaining slot 100 shown in FIG. 16A. Flat spring 41 bears on flat 98 of encoder shaft 97, transmitting rotating motion from the knob 41 to shaft 97. The return to home function is accomplished by plates 39 which are held in place by torsion spring 40. As knob 42 is turned counterclockwise, stop 61 bears against one plate 39. As knob 42 rotates in the counterclockwise direction, plate 39 is driven against torsion spring 40 such that a return force is applied to the knob which will force it back to the home position if the operator lets go of the knob. Return to home from a clockwise position is likewise accomplished by the stop 61 bearing on the other plate 39 and winding up torsion spring 40. Embodiments of controller 2 may have a micro stepping ratio of about 64×.

If power to the linear actuator 1 is turned off, it will maintain its position due to the inherent behavior of the stepper motor 7 of the linear actuator 1. For some embodiments, when the controller 2 is powered off, the last known positions, as well as other parameters and settings, of the motor shafts 9 of the linear actuators 1 are all saved in non-volatile flash or EEPROM memory unit in the controller 2 or in a memory unit disposed on the linear actuator 1. This eliminates the requirement to "home" the linear actuator 1 after a period of being powered off. The position of the shaft 9 of the linear actuator 1 is maintained so that the position of optical components coupled to the linear actuator 1, such as mirrors and the like, is maintained and the alignment of the optical setup and experimental components is not compromised. The flash memory units of either the controller 2 or linear actuator could be configured as removable modular units that could be moved from actuator to actuator or controller to controller depending on the set up being used.

This save settings feature may be accomplished with the use of a voltage sensor that senses supply voltage to the linear actuator 1 in an automatic save setting circuit. For such embodiments, if supply voltage to the linear actuator 1 drops below a certain preselected operating threshold value, the controller 2 goes to a parameter save mode. The last known position of the shaft 9 of the linear actuator 1 may also be saved in non-volatile memory unit on circuit board 14 attached to the back end of stepper motor 7. For this embodiment, an operator may buy one controller 2 and multiple linear actuators 1, then plug the controller 2 into the linear actuator 1 to be actuated. Once the selected linear actuator 1 has been moved or translated, the controller 2 may be disconnected from the selected linear actuator 1 and connected to another linear actuator 1. The controller 2 can then be disconnected from the second linear actuator and reconnected to the first selected linear actuator 1. Upon connection, the saved position information and settings in the non-volatile memory of the first selected linear actuator 1 will be communicated to the controller 2. In each case, the respective linear actuators 1 will stay in their last known position and not try to find a home position like some other commercially available linear actuators.

Figure 17:
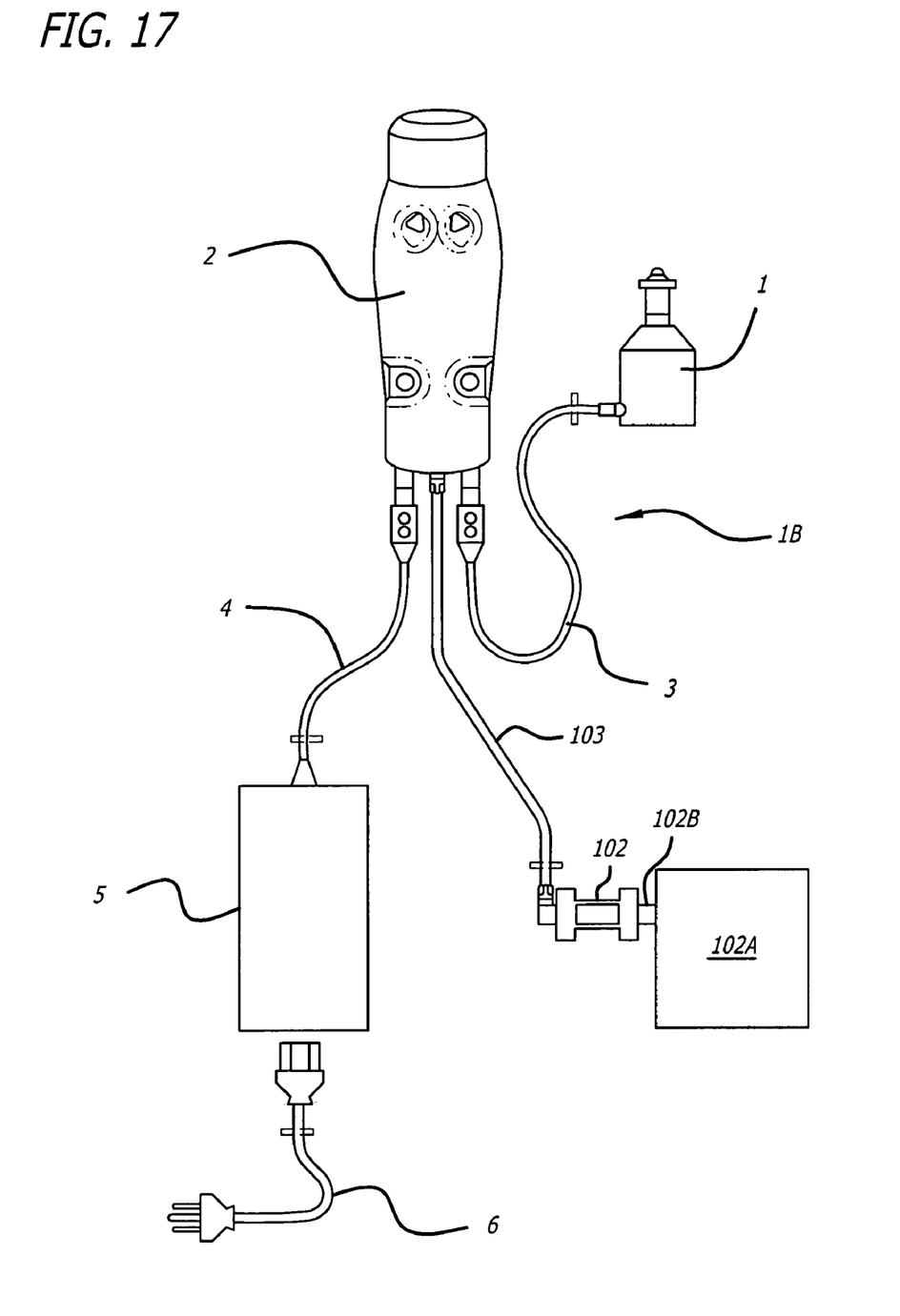
FIG. 17 is a schematic view of a position control system having a single linear actuator with computer interface coupled to a laboratory computer and CPU (not shown) of the laboratory computer.

One alternate embodiment of the position control system 1A is shown in FIG. 17 as position control system 1B. Position control system 1B includes the additional feature of an RS232 output interface 102 coupled to a laboratory computer 102A so that the controller 2 can in turn be controlled by the laboratory computer 102A. Controller 2 has and RS485 port 108 which is connected by an information conduit in the form of cable 103 to an RS485-to-RS232 converter interface 102 which is then attached to an RS232 port 102B in a computer. Although the controller 2 is shown in FIG. 17 as being coupled to laboratory computer 102A by an information conduit in the form of solid cable 103, which could include conductive wires, fiber optic cables or the like, the information conduit could also be a wireless conduit that incorporate commonly available wireless devices and methods. Examples of such wireless embodiments could include Blue Tooth®, IEEE 802, IEEE P1451 or the like. Also, cable 3 disposed between controller 2 and linear actuator 1 could be such a wireless conduit.

Figure 18:
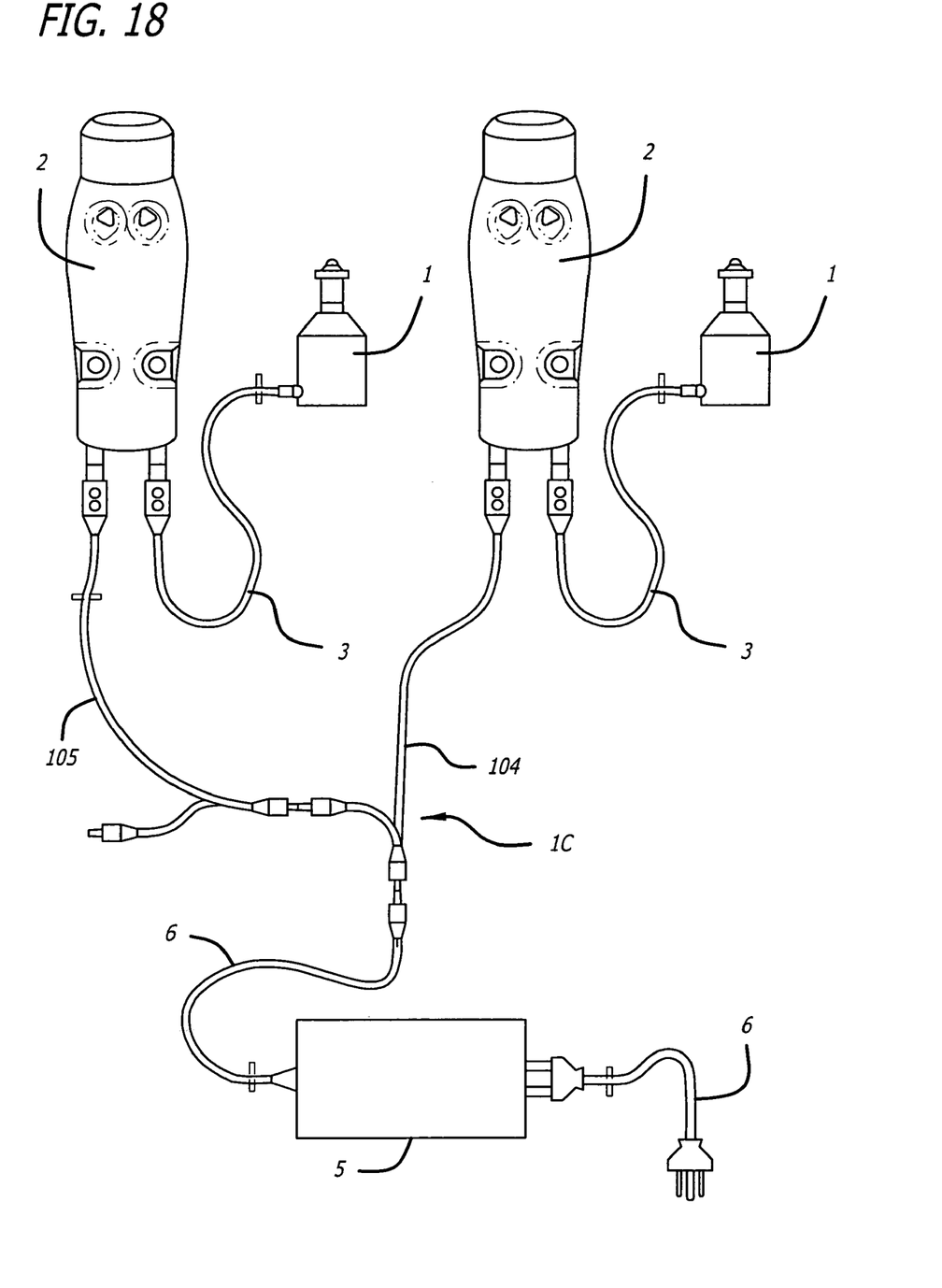
FIG. 18 is a schematic view of a position control system having a two linear actuators and two respective controllers.

Referring to FIG. 18, an additional embodiment of a position control system 1C is shown. The position control system 1C includes two actuators 1 and two controllers 2, coupled to the respective actuators 1. The controllers 2 are connected to the power supply 5 via split power cables 104 and 105. This position control system 1C is configured to operate multiple linear actuators 1 without the use of a laboratory computer 102A as discussed above with regard to position control system 1B. Position control system 1C has a common power supply 5, however, each controller 2 controls the motion of its respective linear actuator 1 independently.

Figure 19:
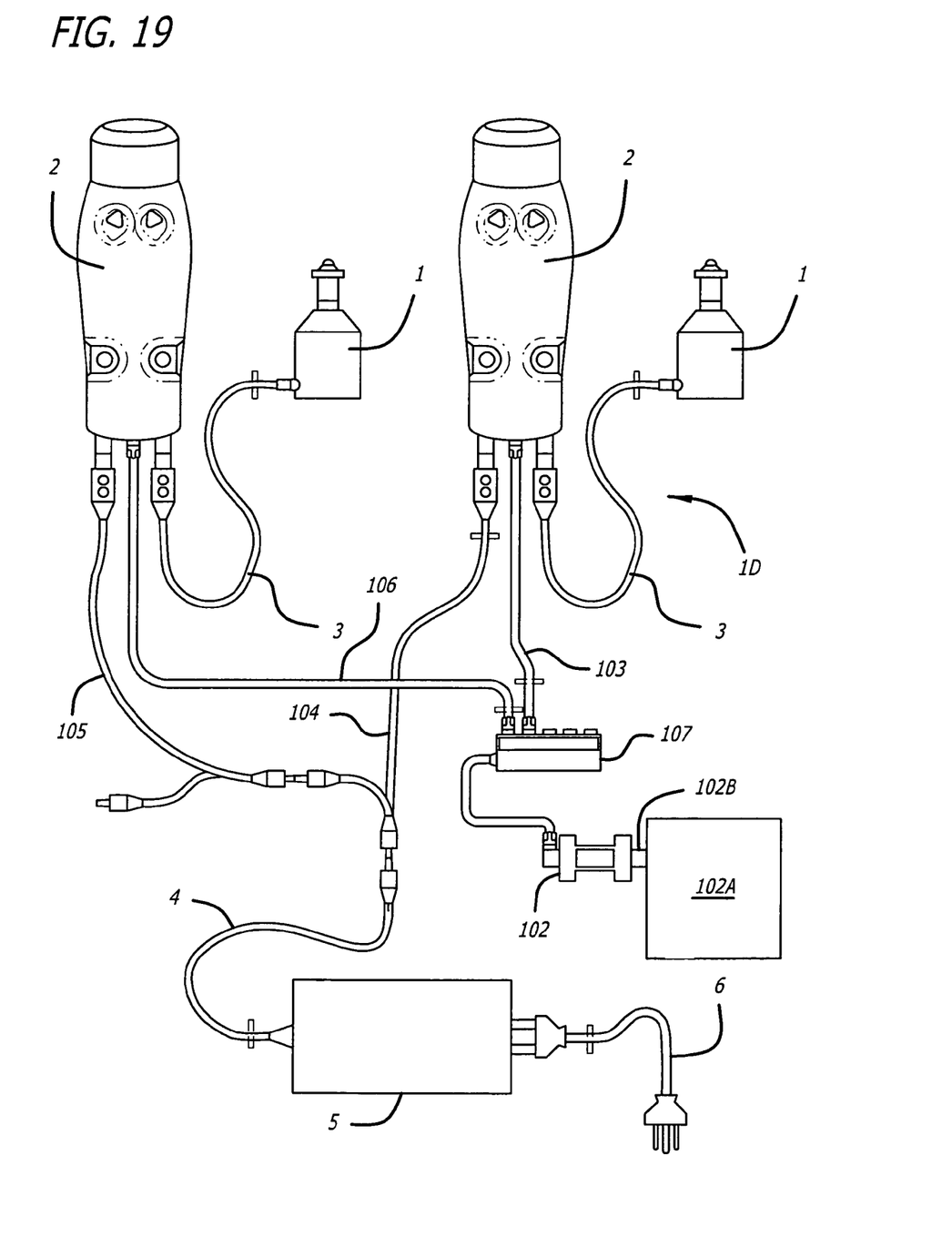
FIG. 19 is a schematic view of a position control system having a two linear actuators and two respective controllers with computer interface cables coupled to a junction box which is in turn coupled to a laboratory computer by a common computer interface.
Figure 20:
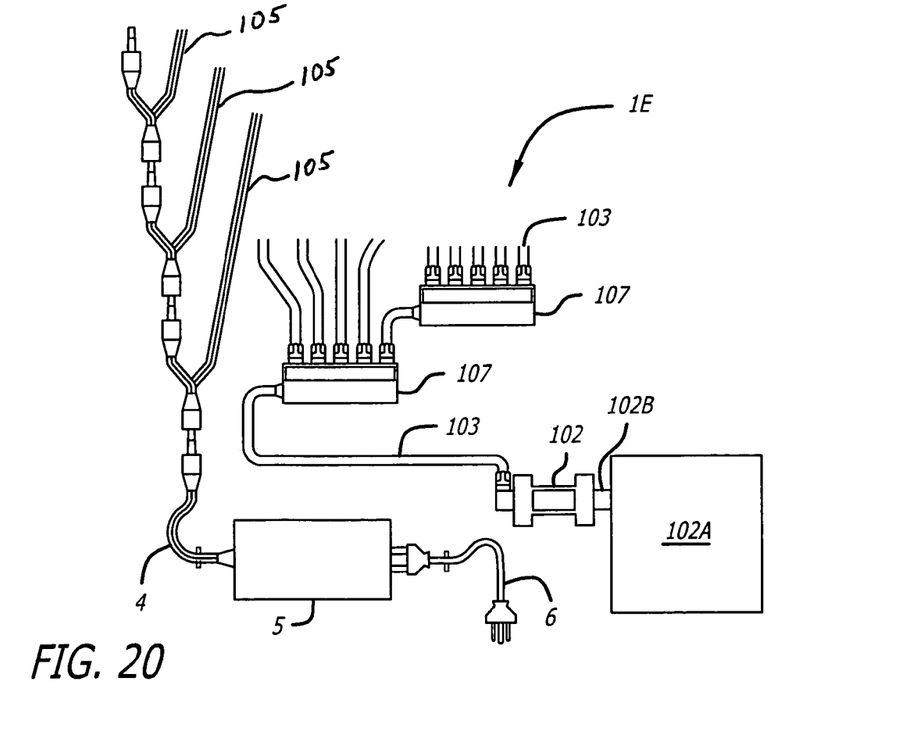
FIG. 20 is a schematic view of a position control system having multiple linear actuators (not shown) and multiple controllers (not shown) with computer interface cables coupled to a first junction box which is coupled to a second junction box which is coupled to a laboratory computer by a common computer interface.

Referring to FIG. 19, an additional embodiment of a position control system 1D includes two linear actuators 1 and two controllers 2 of the previous embodiment shown in FIG. 18 plus information conduits in the form of RS485 cables 103 and 106 routed to RS485 junction box 107. Junction box 107 is in turn connected or coupled to the RS485-to-RS232 converter 102 for interface with the laboratory computer 102A. FIG. 20 illustrates a further embodiment of a portion of a position control system 1E which includes a plurality of actuators 1 (not shown) and controllers 2 (not shown) in addition to a plurality of RS485 cables 103 and 106 routed to RS485 junction boxes 107, which are in turn connected to the RS485-to-RS232 converter 102. The converter 102 is coupled to laboratory computer 102A. With the configuration of the position control system 1E, any desired number of linear actuators 1 and respective controllers 2 may be used and controlled from a single remote location. With regard to these embodiments, utility software for the laboratory computer 102A may include features such as the ability to control multiple linear actuators 1 with a single laboratory computer 102A by using junction boxes 7 in conjunction with the assignment of addresses by the computer 102A to each individual controller 2 coupled to the respective linear actuators 1. In addition, each controller can assign individual addresses to each linear actuator 1 in the set up or the computer 102A can assign individual addresses to each linear actuator 1 directly by bypassing the controllers 2 which may be set in REMOTE mode, discussed below.

If multiple linear actuators 1 and respective controllers 2, set to the REMOTE state setting, are all coupled to a single laboratory computer 102A through information conduits 103 by virtue of one or more junction boxes 107, the laboratory computer 102A can be used to control all the linear actuators remotely. The laboratory computer 102A running utility software configured to control the linear actuators 1 can do so by assigning a separate computer address to each controller 2 associated with each respective linear actuator 1. The utility software can also be configured to ignore controllers 2 coupled thereto which are set in LOCAL state mode. The utility software can be have features which allow a user to display the settings and position information of any selected linear actuator 1 coupled to the computer 102A. A SETUP page in the display of the control software encompasses features which allow a user to determine measurement units, scaling factors, velocity of the linear actuator 1, acceleration of the shaft of the linear actuator 1 and backlash value. Users may also set travel limits, maximum velocity and select a home preset position for the linear actuator 1.

Figure 21:
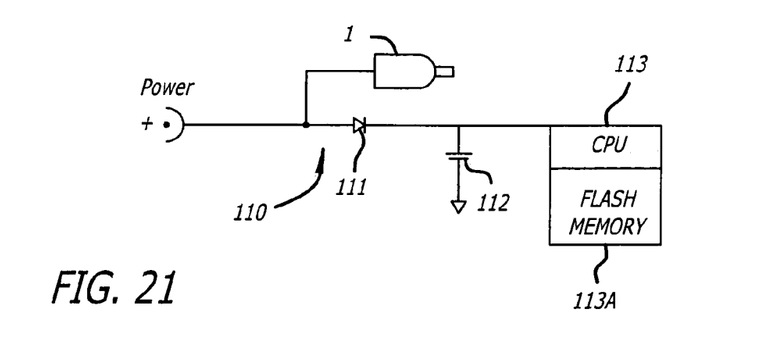
FIG. 21 is a schematic illustration of a circuit that provides an impulse of power to a CPU in order to save system settings and position information in a loss of power or power down situation.

All of these settings can be saved to a flash memory or EEPROM memory unit by selecting a SAVE SETTINGS button on the screen. In addition, the above settings can be saved automatically by individual controllers 2 if the power supply voltage drops below a preselected threshold value which generally corresponds to the voltage value at which the linear actuator 1 ceases to function. Referring to FIG. 21, a schematic diagram is shown indicating a circuit 110, that may be included on the circuit board of a controller 2, having a diode 111 and capacitor 112 which are configured to supply a brief impulse of power to the CPU 113 of the controller 2 after the power supply voltage has dropped below the value at which the linear actuator 1 ceases to operate. The CPU is in turn coupled to a flash memory or EEPROM memory unit 113A. This same automatic save circuit can also be disposed directly in the linear actuator 1 instead of with the controller 2. For one embodiment, the threshold voltage is about 8 to about 12 Volts. The impulse of power to the CPU 113 is used to store the settings and position values to a flash memory or EEPROM memory unit 113A so that these settings and position information can be used again when the controller 2 is restarted. This avoids the need to reset the home position of the linear actuator 1 after a power down or power loss to the control system 1A or any other control system embodiment discussed herein. As discussed above, for some embodiments, the flash memory or EEPROM memory unit 113A may be a modular removable unit that can be used to store position data and settings, and then removed from the control system from which the stored data was obtained and used in another control system or returned to the original control system at a later time.

A VIEW ALL tab of the utility software allows the user to view pertinent data for all active linear actuators 1 coupled to the position control system 1E. A MOVE tab allows a display which prompts the user to move the linear actuator 1 in one of three ways. A JOG-JOG command moves the actuator 1 with a speed proportional to the mouse cursor location on a displayed bar or location on the display screen (not shown) of the computer 102A. A MOVE TO command allows an absolute move of the linear actuator 1 to a specific position. An INCREMENT command moves the actuator 1 one unit of a preselected displacement each time the command is selected. Finally, a HOME command will initiate a home search algorithm.

A CYCLE tab in the utility software allows a cycling of the linear actuator 1 from a first preselected position to a second preselected position, and then back again. The dwell time between cycles and the speed of the cycles can also be selected. A STATUS tab shows a display with command options which display the status of LEDs, limit switches, buttons, encoders and the like of the system. Finally, an ABOUT tab displays the version of the utility software itself and firmware version for the presently connected controller 2.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the invention. Accordingly, it is not intended that the invention be limited by the forgoing detailed description.

What is claimed is:

1. A position control system, comprising:
    a linear actuator including a motor with a shaft having a splined portion and a threaded portion, a threaded rotor having a threaded portion engaged with the threaded portion of the shaft, a splined boss having a splined portion engaged with a splined portion of the shaft and a torsion spring coupled between the shaft and the boss and configured to apply a rotational torque to the shaft relative to the splined boss; and
    a controller coupled to the linear actuator by an information conduit.

2. The system of claim 1 wherein the torsion spring is coupled directly from the shaft to the splined boss.

3. The system of claim 1 further comprising an adjustment mechanism wherein the torsion spring is coupled to the adjustment mechanism and the adjustment mechanism is configured to allow adjustment of the rotational torque applied to the shaft by the torsion spring.

4. The system of claim 3 wherein the adjustment mechanism comprises at least two mating castle nuts.

5. The system of claim 1 wherein the motor comprises a stepper motor.

6. The system of claim 1 wherein the controller comprises a control knob which controls the movement of the shaft of the linear actuator and which is self-zeroing.

7. The system of claim 6 wherein the control knob is bi-directional.

8. The system of claim 1 wherein the information conduit comprises a cable.

9. The system of claim 1 further comprising a flash memory unit that is configured to save position information when power to the linear actuator is stopped.

10. The system of claim 1 further comprising an automatic setting save circuit which is coupled to a CPU of the system and which provides power to the CPU after a supply voltage drops below a preselected operating threshold of the linear actuator so as to allow the CPU to save position information about the linear actuator.

11. The system of claim 1 wherein the information conduit comprises a wireless conduit.

12. A position control system, comprising:
    a linear actuator including a motor with shaft having a splined portion and a threaded portion, a threaded rotor having a threaded portion engaged with the threaded portion of the shaft, a splined boss having a splined portion engaged with a splined portion of the shaft and a torsion spring coupled between the shaft and the boss and configured to apply a rotational torque to the shaft relative to the splined boss;
    a controller coupled to the linear actuator by a first information conduit; and
    a computer coupled to the controller by a second information conduit which is configured to allow a user to send information to the controller from the computer and control the linear actuator remotely from the computer.

13. The system of claim 12 wherein the torsion spring is coupled directly from the shaft to the splined boss.

14. The system of claim 12 further comprising an adjustment mechanism wherein the torsion spring is coupled to the adjustment mechanism and the adjustment mechanism is configured to allow adjustment of the rotational torque applied to the shaft by the torsion spring.

15. The system of claim 14 wherein the adjustment mechanism comprises at least two mating castle nuts.

16. The system of claim 12 wherein the motor comprises a stepper motor.

17. The system of claim 12 wherein the second information conduit comprises a multi-pole conductive cable.

18. The system of claim 12 wherein the second information conduit comprises a wireless conduit.

19. The system of claim 12 wherein the first information conduit comprises a wireless conduit.

20. The system of claim 12 further comprising a flash memory unit that is configured to save position information when power to the linear actuator is stopped.

21. The system of claim 12 further comprising an automatic setting save circuit which is coupled to a CPU of the system and which provides power to the CPU after a supply voltage drops below a preselected operating threshold of the linear actuator so as to allow the CPU to save position information about the linear actuator.

22. A linear actuator, comprising a motor with shaft having a splined portion and a threaded portion, a threaded rotor having a threaded portion engaged with the threaded portion of the shaft, a splined boss having a splined portion engaged with a splined portion of the shaft and a torsion spring coupled between the shaft and the boss and configured to apply a rotational torque to the shaft relative to the splined boss.

23. The actuator of claim 22 wherein the torsion spring is coupled directly from the shaft to the splined boss.

24. The actuator of claim 22 further comprising an adjustment mechanism wherein the torsion spring is coupled to the adjustment mechanism and the adjustment mechanism is configured to allow adjustment of the rotational torque applied to the shaft by the torsion spring.

25. The actuator of claim 24 wherein the adjustment mechanism comprises at least two mating castle nuts.

26. The actuator of claim 22 wherein the motor comprises a stepper motor.

27. The actuator of claim 22 further comprising a motor housing carrying the shaft and an actuator housing carrying the motor and wherein the back end of the motor housing is firmly and mechanically coupled to the back of the actuator housing.

28. The actuator of claim 27 wherein the actuator housing comprises a metal cylinder having a proximal end plate, a distal cap and a threaded boss on the distal cap.

29. A position control system, comprising:
a linear actuator including a motor with a shaft;
a controller which is coupled to the linear actuator by an information conduit and which includes a self-zeroing control knob which controls the movement of the shaft of the linear actuator; and
an automatic setting save circuit coupled to a CPU of the controller which provides power to the CPU after the a supply voltage drops below a preselected operating threshold of the linear actuator so as to allow the CPU to save position information about the linear actuator.

30. The system of claim 29 wherein the motor comprises a stepper motor.

31. The system of claim 29 wherein the control knob is bi-directional.

32. The system of claim 29 further comprising a flash memory unit that is coupled to the CPU and configured to save position information when power to the linear actuator is stopped.

33. The system of claim 29 wherein the automatic save circuit is disposed on the controller.

34. The system of claim 29 wherein the automatic save circuit is disposed on the linear actuator.

* * * * *